(12) United States Patent
Shigekauzu et al.

(10) Patent No.: US 6,255,410 B1
(45) Date of Patent: Jul. 3, 2001

(54) PROCESS FOR POLYMERIZING OLEFINIC FEEDS UNDER PRESSURE

(75) Inventors: Hayashi Shigekauzu, Suzuka; Makoto Sugawara, Yokkaichi, both of (JP); Norbert Baron, Cologne (DE); Charles Stanley Speed, Dayton; Jo Ann Marie Canich, Houston, both of TX (US); Howard Curtis Welborn, Jr., deceased, late of Houston, TX (US), by John L. Zipprich, II, executor

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 08/937,337

(22) Filed: Sep. 2, 1997

Related U.S. Application Data

(63) Continuation of application No. 08/244,948, filed as application No. PCT/EP92/02803 on Dec. 2, 1992, now abandoned.

(30) Foreign Application Priority Data

Dec. 5, 1991 (GB) ................................................. 9125934

(51) Int. Cl.$^7$ ............................... C08F 2/04; C08F 2/34; C08F 4/64

(52) U.S. Cl. .............................. 526/68; 526/88; 526/160; 526/943

(58) Field of Search ............................... 526/68, 88, 160, 526/943

(56) References Cited

U.S. PATENT DOCUMENTS

| | | | |
|---|---|---|---|
| 4,433,121 | 2/1984 | Kabu et al. | 526/68 |
| 4,564,647 | 1/1986 | Hayashi et al. | 523/211 |
| 4,791,180 | 12/1988 | Turner | 526/160 |
| 5,153,157 | 10/1992 | Hlatky et al. | 502/117 |
| 5,408,017 | 4/1995 | Turner et al. | 526/134 |

FOREIGN PATENT DOCUMENTS

| | | |
|---|---|---|
| 26 08 933 C2 | 9/1977 | (DE) . |
| 3150270 A1 | 6/1983 | (DE) . |
| 0 069 593 A2 | 1/1983 | (EP) . |
| 0 109 530 A1 | 5/1984 | (EP) . |
| 0 129 368 B1 | 12/1984 | (EP) . |
| 0 260 999 A1 | 3/1988 | (EP) . |
| 0 303 519 B1 | 2/1989 | (EP) . |
| 0 308 177 B1 | 3/1989 | (EP) . |
| 0 399 348 A2 | 11/1990 | (EP) . |
| 0 416 815 A2 | 3/1991 | (EP) . |
| 0 420 436 A1 | 4/1991 | (EP) . |
| 0 477 177 A2 | 9/1991 | (EP) . |
| 447177 | 9/1991 | (EP) . |
| WO 88/05792 | 8/1988 | (WO) . |

OTHER PUBLICATIONS

"Polymerization of Ethylene with Ziegler Catalysts Under High Pressure", H. Grunig and Gerhard Luft, Polymer Reaction Engineering, 293–297, Jul., 1986.

Primary Examiner—David W. Wu
Assistant Examiner—R. Rabago
(74) Attorney, Agent, or Firm—Stephen D. Prodnuk; Frank E. Reid; Darrell E. Warner

(57) ABSTRACT

The invention relates to processes for producing polyolefins at pressures substantially below conventional high pressure conditions in two-phase conditions below the cloud point. The invention can involve a continuous system with optional recycle.

27 Claims, 5 Drawing Sheets

PHASE BEHAVIOR OF MIXTURES OF 90 WT% OF ETHYLENE/HEXENE MONOMER AND ETHYLENE BUTENE-1 COPOLYMER HAVING A DENSITY OF 0.905 AND A MI OF 2
HEXENE/ETHYLENE MONOMER WEIGHT RATIOS:
a) 60:40,  b) 70:30,  c) 80:20,  d) 85:15 wt%

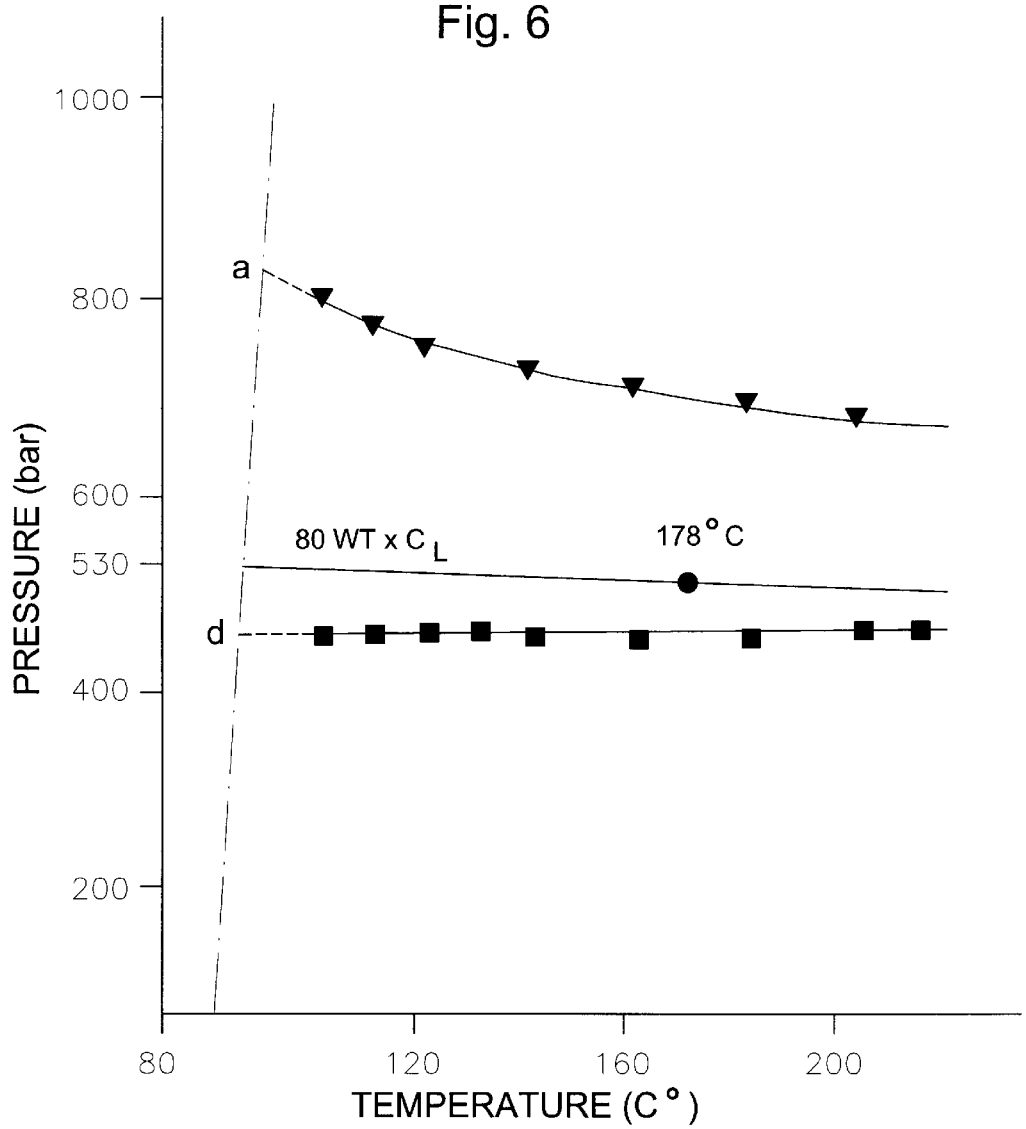
PHASE BEHAVIOR OF MIXTURES OF 90 WT% ETHYLENE/BUTENE MONOMERS AND 10 WT% OF ETHYLENE BUTENE COPOLYMER BUTANE ETHYLENE WEIGHT RATIOS: a) 160:40, d) 85:15

PROCESS FOR POLYMERIZING OLEFINIC FEEDS UNDER PRESSURE

This is a continuation of application Ser. No. 08/244,948, filed Jan. 9, 1995 now abandoned, which is a 371 of PCT/EP92/02803 filed Dec. 2, 1992.

FIELD OF THE INVENTION

The invention relates to processes for polymerising olefinic feeds using metallocene based catalyst systems under pressure. The olefinic feeds may contain ethylene, propylene, higher olefins and polyenes such as butadiene as well as vinyl compounds and copolymerisable aromatic compounds such as styrene and copolymer-sable other cyclo-olefins such as norbornene. The term metallocene refers to compounds containing a coordination bond between a transition metal and at least one (generally one or two) cyclopentadiene ring structures. The term cyclopentadiene ring structure includes polycyclic structures such as indenyl or fluorenyl which incorporate a five-membered ring.

BACKGROUND OF INVENTION

DE 2608933 (BASF) discloses a low pressure (e.g. 9 bar), metallocene catalysed polymerisation step for ethylene. The temperature may be varied to control molecular weight. Lower temperatures provide higher productivity and higher molecular weights. There is no suggestion of pressure as a major influence on the polymerisation process.

EP 69593 (Mitsui) performs a special form of solution polymerisation with phase-separation using non-metallocene Ziegler-Natta catalyst systems. Significant amounts of solvent are present. A solution is formed having an upper cloud point for the polymer/monomer mixture in the reaction medium, such as an inert hydrocarbon, which is liquid under the prevailing conditions. Polymerisation is carried out above a so-called upper cloud point.

EP 109530 (EC Erdolchemie) discloses a low to medium pressure (up to 400 bar) gas phase polymerisation conducted above the melting point of the polymer with ethylene feed gas and molten polymer flowing in opposite directions. Particulate catalyst systems are used including metallocene-type transition metal components and alumoxane co-catalyst components. There is no agitation by mechanical means or turbulence of the molten polymer and a settling step is not necessary to coalesce the discontinuous polymer-rich phase.

EP 260999 (Exxon) discloses a high pressure ethylene polymerisation process at temperatures over 120° C. and at least 500 bar using a bis cyclopentadienyl-transition metal compound and alumoxane as a catalyst system. Zirconocenes are used in the Examples. The Al/Zr ratio varies widely in the Examples (See Table 4). Example 18 uses 200° C. and 500 bar for homopolymerisation of ethylene. The experiments are performed in 100 ml steel autoclaves in a batch procedure. The productivity of the catalyst system cannot be estimated reliably due to variations in catalyst performance. The Al/Zr ratio of 29390 gives low productivity (productivity as used herein indicates the amount of polymer produced per total amount (Al+Zr) of catalyst metal) caused by the high Al content of the catalyst system. Other Examples illustrate continuous procedures at lower Al/Zr ratios but process conditions particularly pressure are such that the reactor contents are above the cloud point.

DE 3150270 (EC Erdolchemie) also claims broad temperature and pressure ranges using an Al/transition metal ratio in the Examples of circa 2500 but does not specifically teach any combination thereof which gives rise to two-phase conditions.

In a paper given by G. Luft in 1989 at the Hamburg Macro-molecular Symposium, high pressure polymerisation is performed at 1500 bar with Al/Zr ratio's well in excess of 10000 (ten thousand). As in DE 2608933, temperature is recognised as a major influence on the process. Lower temperatures are associated with higher catalyst productivity and higher molecular weight but the polymerisation rate is lower as a result of the lower temperature.

EP 416 815 uses low pressures but solvent present provides 1-phase conditions.

EP 399 348 uses low pressures but these either are 1-phase (solution) or involve temperatures below the melting point (suspension or gas-phase polymerisation). Also WO 88/05792 does not describe a two phase condition above the polymer melting point.

With gas-phase systems, the polymerisation rate is limited by the concentration of polymerised polymer pellet and the monomer concentration as well as the monomer diffusion through the polymer pellet growing around the supported catalyst particle.

The monomer feed in gas-phase operation has to be recirculated and conversion at each pass is limited by the permissible adiabatic temperature increase. Polymers with higher amounts of comonomer or low molecular weight product cannot be conveniently made if process conditions become unsatisfactory.

With high-pressure systems, it has generally been believed that high temperatures and pressures are necessary to obtain conditions conducive to good productivity of the catalyst system. To the extent that the art refers to lower pressures it is generally to delimit a lower end of a very broad pressure range. Actual examples in the art concern high pressures.

It is hence desirable to provide a process for polymerising olefinic feeds having a low catalyst consumption, energy requirement and capital costs but capable of producing a variety of polymers.

SUMMARY OF THE INVENTION

The invention firstly provides a process for producing a polyolefin comprising
(a) continuously feeding olefinic monomer and a catalyst system of a metallocene and a cocatalyst;
(b) continuously polymerising the monomer(s) to provide a monomer-polymer mixture, the mixture being at a pressure below the cloudpoint pressure to provide a polymer-rich phase and a monomer-rich phase at a temperature above the melting point of the polymer;
(c) continuously settling the two-phase mixture into a continuous, molten polymer phase and a continuous monomer vapour which may optionally be at least partly recycled to (a).

Unlike earlier disclosures a two-phase mixture is formed during polymerisation and not merely when the pressure of the reaction mixture is reduced downstream of a let-down valve after polymerization (as is the case in conventional high pressure polymerization procedures). The two-phase mixture may be maintained, preferably in a finely devided form, by appropriate agitation, e.g., with the assistance of a stirrer.

In the stable operating conditions possible with continuous operation according to the invention, generally the catalyst productivity starts to increase upon decreasing pressure further below the cloudpoint. Reduced operating pressures hence become possible, permitting processes which are simpler and require less energy. It may be that the higher productivity levels possible below the cloudpoint pressure exceed those possible above the cloudpoint at much more elevated pressures and approximately similar temperatures.

The continuous process may be used to provide a home- or co-polymer. Preferably in this first aspect of the invention the polyolefin contains less than 25% by wt of a comonomer. The comonomer is preferably an olefin or diolefin having from 3 to 20 carbon atoms and/or the metallocene is substituted dicyclopentadienyl derivative. The polymer can advantageously contain from 10 to 20 wt % of the comonomer. Suitably the mixture is settled in a separator after the catalyst system has been killed by addition of a killer, preferably at a pressure of from 1.2 to 300 bar especially 50 to 200 bar or 30 to 70% of the polymerization pressure and the continuous monomer is recycled for polymerisation. At appropriate productivities, comparable to those obtainable at high pressure and exceeding those obtainable with conventional low pressure gas-phase, bulk-phase processes, high conversion speeds can be achieved. Preferably the residence time is from 20 seconds to 10 minutes, preferably from 30 seconds to 5 minutes, and especially less than 2 minutes.

The invention secondly provides a process for producing a polyolefin comprising
(a) feeding ethylene, at least 5 wt % of at least one comonomer and a catalyst system of a metallocene and a cocatalyst;
(b) polymerising the monomer and comonomer under agitation to provide a monomer-polymer mixture, the mixture being at a pressure below the cloudpoint pressure at a temperature above the melting point of the polymer and preferably at a pressure of less than 500 bar to provide a discontinuous polymer-rich phase and a continuous monomer rich phase; and
(c) separating the polymer.

Unlike earlier disclosures, there is provided for the first time a copolymer producing process that can give high productivities at below 500 bar above the polymer melting point. The presence of comonomer lowers the pressure of the cloudpoint significantly and so permits enhanced energy savings as well as possible increased catalyst system productivities discussed before.

Advantageously the polyolefin contains at least 10 wt % of a comonomer, preferably an olefin or diolefin having from 3 to 20 carbon atoms and/or the metallocene is a monocyclopentadienyl derivative having a low transfer activity. With transfer activity is meant the propensity for chain propagation to be transferred from one growing polymer chain to another. Transfer activity results in lower molecular weights. It is sensitive to comonomer concentrations which tend to increase transfer activity. Selected metallocene based catalyst system such as monocyclopentadienyl based systems can be relatively insensitive as regards transfer activity to comonomer presence, so permitting higher molecular weights to be obtained at higher comonomer contents and/or higher operating temperatures at similar molecular weights.

If appropriate the reactor is a continuous reactor. Preferably the polymer has a density of from 0.82 to 0.93 g/cm$^3$ preferably less than 0.90.

Such catalyst systems should be selected by preference to provide low ash content products at commercial production rates. With ash content is meant the residual metal in the polymer. Catalyst systems with a lower aluminium/transition metal mol ratio show a greater improvement in productivity with lowering of pressure below the cloudpoint than catalysts systems with a high ratio. The invention hence facilitates the efficient production of polymer with low ash contents.

It is believed, without delimiting the invention, that the two-phase system includes a polymer rich phase still containing appreciable monomer ready for polymerisation and a monomer rich phase containing some polymer. The catalyst is believed to be most active in the polymer-rich phase. The presence of the monomer in the polymer-rich phase is believed to contribute to increased catalyst system productivity.

Optimum pressure selection will vary depending on operational requirement and comonomer levels. The polyolefin properties may change relatively little with pressure. Hence the temperature can be adjusted to provide the desired polymer at a pressure which has been set to give optimum productivity performance.

Preferred operating temperatures vary from 80 to 250° C. preferably from 100 to 225° C., and should, for a given polymer in the reactor, be above the melting point so as to maintain the fluidity of the polymer-rich phase as indicated previously.

The pressure can be varied between 100 and 1000 bar for ethylene homopolymers and from 30 to 1000 especially 50 to 500 for processes producing ethylene copolymers containing $C_3$ to $C_{10}$ olefins and optionally other copolymerisable cyclo-olefins.

In both the aforementioned main aspects of the invention suitably polymerisation can take place at a temperature and pressure there the catalyst system productivity exceeds that which obtains at twice that pressure above the cloud point pressure at that temperature.

Conveniently the catalyst system contains alumoxane cocatalyst, is in the form of a soluble system, on unsupported slurry system or a supported system, and/or the mol ratio of alumoxane aluminum to metallocene transition metal is from 10:1 to 10000:1 Preferably 50:1 to 5000:1. The reactor may have no internal cooling systems and can be adiabatic. It is preferably mechanically agitated.

With sufficient comonomers, the process can be performed at less than 500 bar. The minimum pressure is generally determined by agitation conditions and is preferably at least 50 and especially at least 100 bar; gaseous phase densities in the reactor being at least 200 kg/m3, especially 350 kg/m3. Good mixing is promoted by the use of temperatures well above the melting or crystallisation point, suitably 10° C. and especially 30° C. above. It is estimated that generally the polymer rich phase contains from 50 to 80 wt % of polymer.

BRIEF DESCRIPTION OF THE DRAWINGS

FIG. 6 shows cloudpoints of ethylene-butene copolymer in a monomer blend of ethylene and butene.

Figure 1:
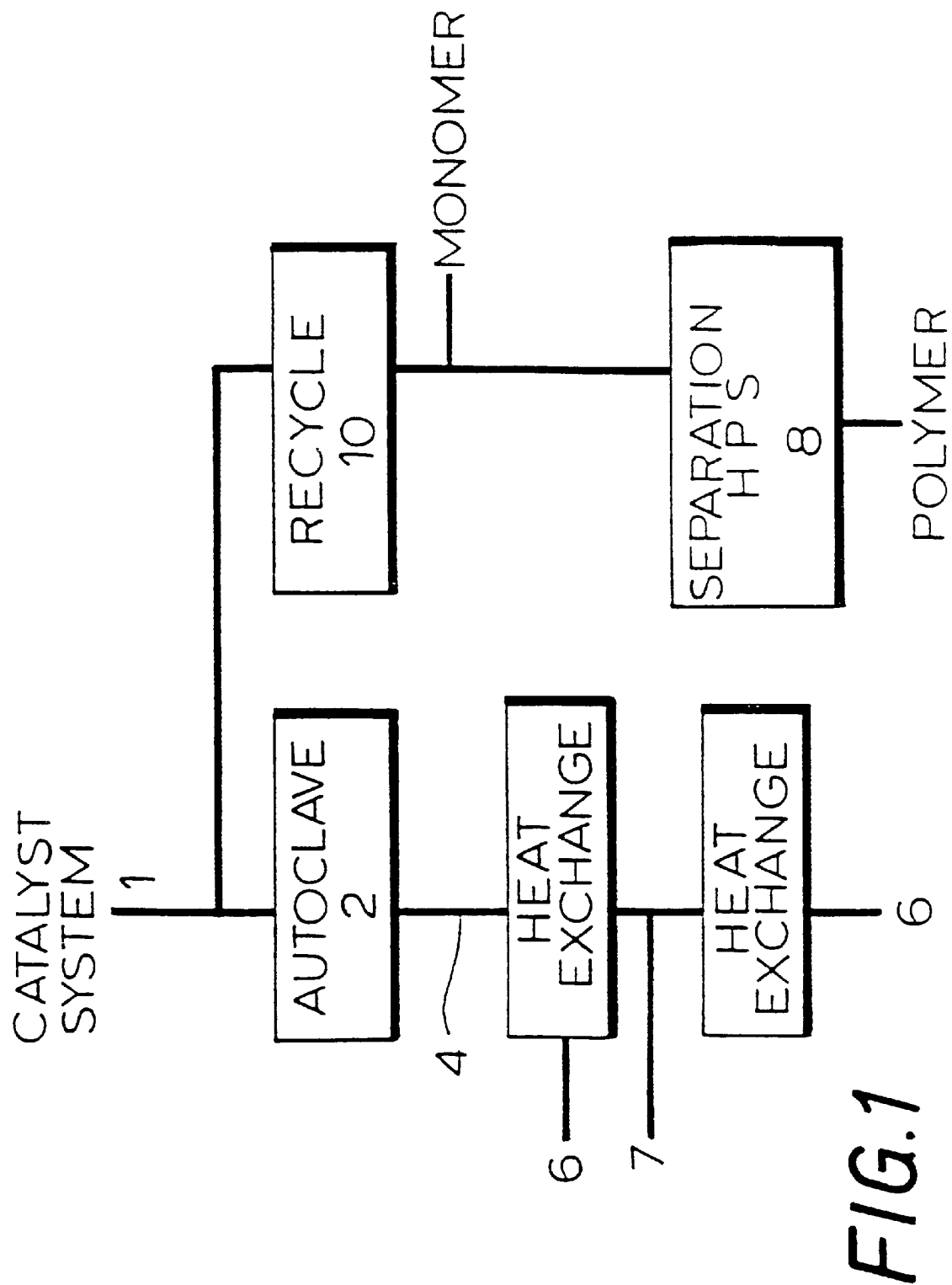
FIG. 1 is a block diagram illustrating certain aspects of the process.

The data show that it is possible to provide high metallocene activity at pressures below the cloudpoint.

DETAILED DESCRIPTION OF THE INVENTION

The term "olefinic monomer" is used herein to include olefin feeds containing one monomer only as well as feeds of two or more olefinic monomers which may include polyenes including diolefins such as butediene or 1,4 hexadiene and cyclo-olefins such as norbornene.

The term "catalyst system" is used herein to embrace a transition metal component and a cocatalyst component. The term "metallocene" is used generically to include mono-, di- and tri-cyclopentadienyl type transition metal compounds.

The invention is based on the finding that such catalyst systems show increasing productivities with lowering of pressure at pressures towards the extreme lower end or below the lower end of ranges conventionally associated with high pressure polymerisation. It is believed, without wishing to delimit the invention, that the existence of two-phase conditions influences the distribution of compounds (metallocene, cocatalyst, poison) in some way with an overall effect of promoting polymerisation productivity.

In the description and claims, reference is made to the cloud point. This is the point at which the polymer formed starts separating as a distinct phase and ceases to be dissolved in the overall mixture with the unreacted monomer. At pressures above the cloud point one phase conditions prevail; two-phase conditions prevail below. Thus the term "cloud point pressure" means the highest pressure at which a monomer-polymer mixture can be heterogeneous with a polymer-rich chase and a monomer-rich phase at a temperature above the melting point of the polymer. It corresponds to the lower cloud point in EP 69593.

Example 1 shows that pressure at which one-phase conditions cease to exist and two-phase conditions apply can be determined by an overall combination of individual process indicators. Whilst, as a practical matter, there may be an extended transition zone, where it is difficult to determine definitively whether the system is entirely in a two-phase or single phase condition, the benefits obtainable by the invention increase rapidly as one moves through the transition zone to substantial two-phase conditions. At commercially attractive operating pressures there is no doubt that (i) two-phase conditions exist and (ii) the productivity is higher than that existing at, or slightly above, the cloud point.

The pressure or pressure zone of the cloudpoint, at which the transition occurs, depends amongst other things on the temperature, polyolefin and olefinic monomer type and proportion. The cloudpoint can also be changed so that it occurs at a higher temperature or lower pressure by including an anti-solvent such as nitrogen which promotes the segregation into a polymer-rich phase and a monomer-rich phase. The anti-solvent does not take part in the polymerisation and is substantially inert.

The reactor outlet temperature should preferably be at least 100° C.

The process may be used for polymerising ethylene or higher olefins such as propylene, 1-butylene with or without modifier such as $H_2$, with or without higher molecular weight comonomers such as propylene, butylene and/or other ethylenically unsaturated comonomers having from 3 to 20 carbon atoms, preferably having up to 10 carbon atoms. The high catalyst productivity obtainable by the process of the invention permits the incorporation of polyenes such as $C_4$ to $C_{12}$ dienes including butadiene, isoprene or 1,4-hexadiene which are not otherwise easily incorporated with catalyst functioning at lower activities. The process also facilitates production of polymers containing high comonomer levels under economically viable conditions. Polymerisation condition (temperature; pressure) may vary depending on the monomers, the desired polymer product characteristics and/or catalyst system employed.

The type and amount of comonomer changes the pressure at which phase conditions change from one phase to two phase conditions when pressure is reduced. An increase in comonomer content and a decrease in polymer molecular weight reduces the cloudpoint pressure.

The polyolefin generally contains at least 20% of ethylene, especially from 40 to 60 wt % to make high comonomer content, low density amorphous products such as VLDPE having a density of from 0.915 to 0.900: elastomers, thermoplastic elastomers or ultra low density polyethylene (ULDPE) having a density of from 0.870–0.900 and even lower density elastomeric materials having a density of 0.855 to 0.870.

The catalyst system includes the metallocene component and the cocatalyst component which is preferably an alumoxane component or a precursor of alumoxane.

The catalyst system may include as metallocene a compound of the general formula

R Z L M wherein M is a transition metal of group IV B, V B or VI B of the Periodic Table, 66th Edition of Handbook of Chemistry and Physics CRC Press (1985–86) CAS Version, wherein R is a ligand having a conjugated electron bonded to M;
wherein L is a leaving group bonded to M and
wherein Z represent one or more further conjugated ligands and/or anionic leaving groups bonded to M and/or a moiety bonded to M and to R.

The group R and optionally the group Z where Z is a conjugated ligand, may be or include a substituted or unsubstituted cycloalkadienyl group such as cyclopentadiene or a cyclopentadienyl with linked substituents such as indenyl, fluorenyl or tetrahydro-indenyl. Where at least one Z is a cycloalkadienyl conjugated group, the different cycloalkadienyl groups of R and Z may be bridged (See Exxon EP 129 368). Where one conjugated ligand group R is present and Z is not a conjugated ligand, the group R may be bridged to other transition metal ligands such as Z.

The group L and optionally the group Z where Z is an anionic leaving group may be or include an aryl group, alkyl group, an aralkyl group, a halogen atom, a hetero atom containing ligand containing an oxygen, sulfur, nitrogen or phosphorus atom (hetero atom may be bonded to M); these groups L and Z may be connected by single or multiple bonds to M; optionally these groups may be linked to groups R or Z. Possible species are described in EP 416815 and EP 420436.

The other catalyst component, generally alumoxane, may be prepared in a pre-reaction and then introduced into the polymerisation system but may also be formed wholly or partly in situ by reaction of water and a trialkylaluminum, preferably trimethylaluminum. Water may be introduced in the monomer feed for this purpose as taught in EP 308177.

The Al/transition metal mol ratio may be from 10 to 10000, preferably from 50 to 5000 and especially from 100 to 2000 as discussed previously. Satisfactory results can be obtained between 200:1 and 1000:1.

The selection of the catalyst system may influence the productivity of the catalyst and the rate at which catalyst system productivity increases with reducing pressure when one-phase conditions have ceased to exist. The Aluminum/metallocene mole ratio can be significant as can the type and activity level of the metallocene.

Where the gaseous monomer phase is recycled preferably a catalyst killer system is used to prevent polymerisation in the separation and recycling stages.

Thus it is possible to produce polyolefins at high catalyst system productivities, with relatively low energy consumption because of low operating pressures. Polyolefins so produced may have a high or low molecular weight and may be crystalline, i.e. have a clear melting point or may be very elastomeric, amorphous in character in which case the melting point may be less distinct.

Compared with solution processes performed in two phase conditions (See EP 69 593) the reactor mixture contains less than 70% by wt of solvent, preferably less than 50% and especially less than 25%.

Example 1

The polymerization was carried out (See FIG. 1) in a high-pressure continuous polymer production facility, at changing reaction pressures and a polymerisation reactor outlet temperature of from 140 to 220° C.

The facility has a letdown valve 4 for reducing the pressure downstream of a stirred polymerisation autoclave reactor 2. Downstream of the valve there is located a catalyst killer injection point 7. Heat exchangers 6 allow heating or cooling of the mixture emerging from reactor.

Downstream of the exchanger, there is provided a high pressure separator 8 (HPS) for separating the monomer/polymer mixture. The polymer rich phase is taken from the HPS for further processing; the monomer rich phase is recycled to the reactor via the high pressure recycle system 10 consisting of a series of coolers, polymer knockout vessels (for removing low molecular weight residues) and a high pressure compressor which supplies the monomer feed to the polymerisation reactor at the required process pressures. The catalyst system is injected into the reactor under the required temperature, pressure and mixing conditions through injection system 1.

In the Example, a compressed monomer feed and catalyst system were introduced continuously into an adiabatic, non-cooled autoclave. After a residence time during which polymerisation occurred, the contents were removed from the auto-clave under the control of the let-down valve 4 and then passed to a high pressure separator operating at 180 bar and 190° C.±10° C. A molten polymer phase was removed from the HPS and passed to a low pressure separator operating at reduced pressure. From the low pressure separator the molten polymer was supplied to a gearpump for forming pellets; separated gas was recycled or disposed of.

The monomer was introduced into the recycle loop at the pressure of the HPS at a flow rate set to compensate for the removal of raw material as polymer or monomer (dissolved in the polymer). The monomer feed was a mixture of ethylene 35 wt % and 1-butene 65 wt %. A catalyst system of dimethylsilyl bis-tetrahydro-indenyl zirconium dichloride and methyl-alumoxane (MAO) (Al/Zr mol ratio=400) dissolved in toluene was pumped into the autoclave 2 so as to maintain a predetermined temperature of 150° C. in the top to 170° C. in the bottom giving a monomer conversion of 11.5%. The catalyst system solution contained 0.4 g/l of metallocene and 2.5 wt % of MAO. During a test run the setting of the let-down valve 4 was varied to change the pressure in the autoclave. Catalyst killer (a waterbased volatile/non-volatile catalyst system killer combination) was also added. The catalyst killer was obtained as follows: 1 weight part of glycerol mono-oleate was diluted with 1 weight part of iso-octane and agitated at 40° C. Then 0.05 wt parts of demineralized water was added and the warm mixture was agitated until a clear solution was obtained. This solution then was diluted further by adding 8 wt parts of iso-octane.

Figure 2:
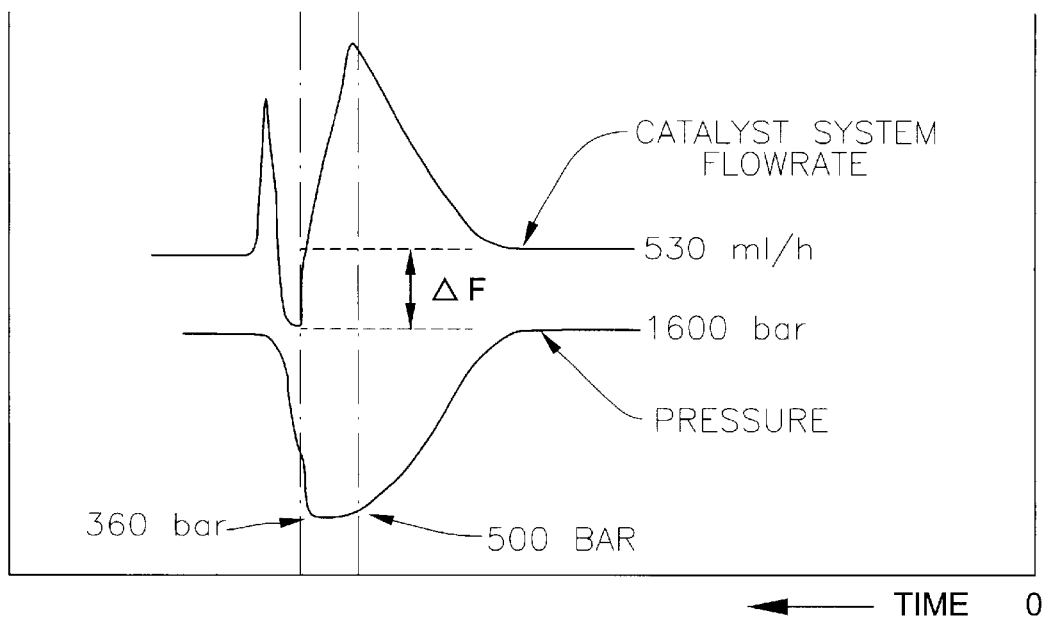
FIGS. 2 and 3 show measurements of catalyst consumption.
Figure 3:
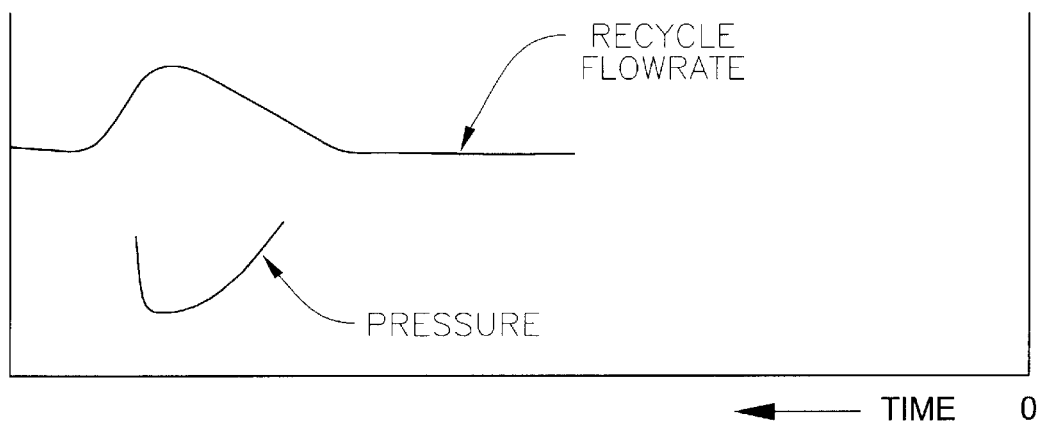
Figure 4:
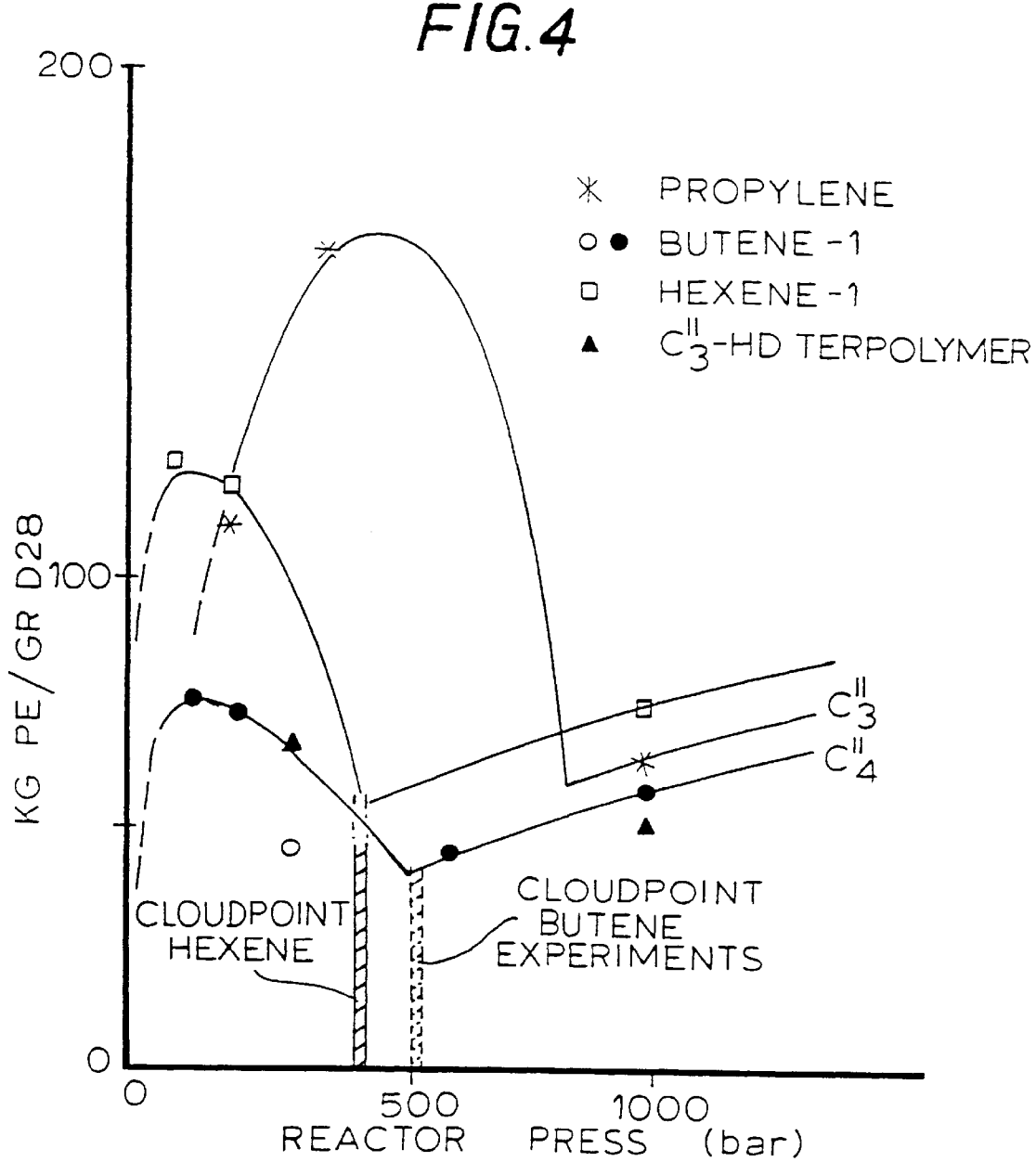
FIG. 4 illustrates the results of Table 2 graphically. The cloudpoints are shown.
Figure 5:
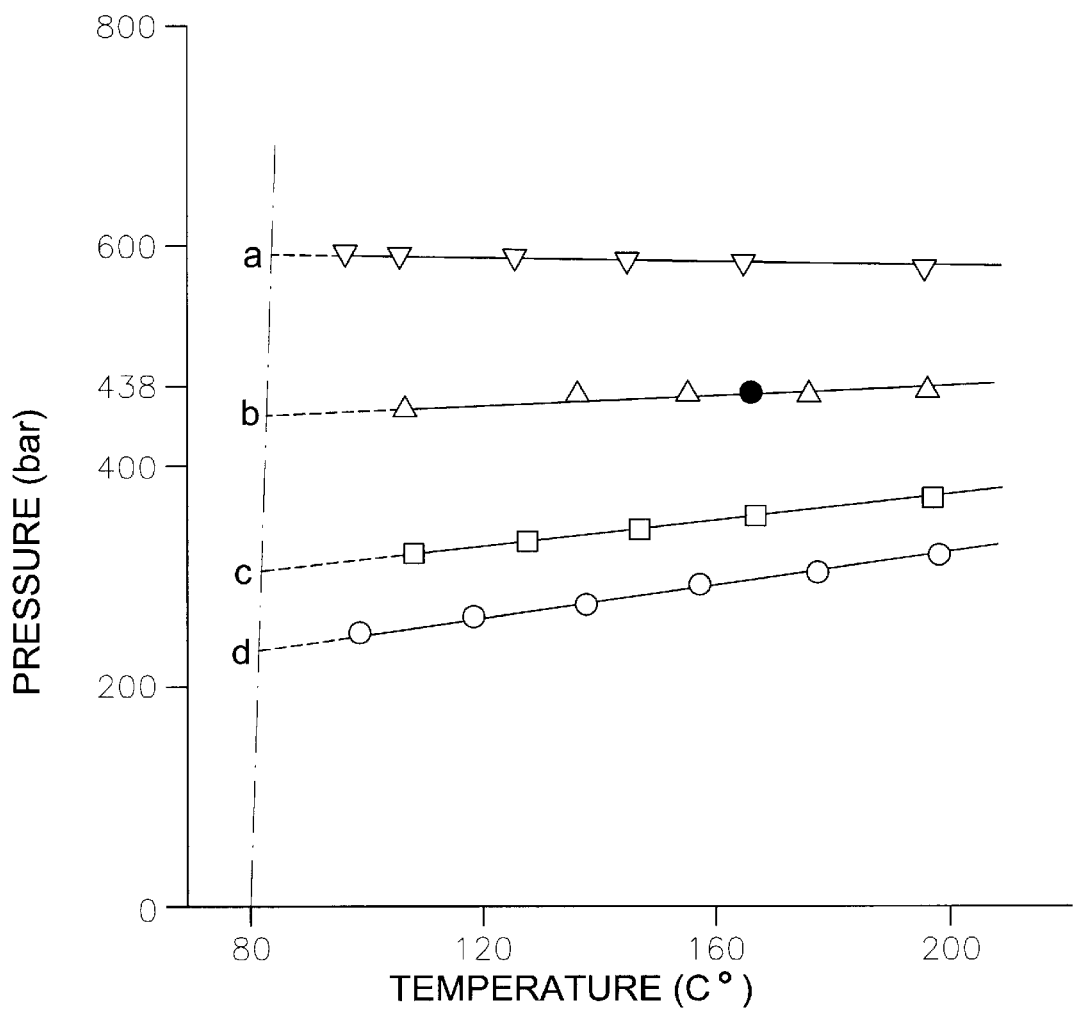
FIG. 5 shows cloudpoints with varying pressure and temperature for the four stated mixtures of ethylene-butene copolymer in a monomer blend of ethylene and hexene.

FIGS. 2 and 3 show measurements of the catalyst consumption (i.e. the inverse of catalyst productivity and the recycle flow rate respectively contemporaneous with the changing pressure.

Around 500 bar a small change in energy consumption necessary for maintaining stirrer speed in the autoclave 2 was observed. This suggests a change of phase conditions and that the cloudpoint was reached.

Between 1600 bar and 500 bar, the catalyst productivity decreases by almost half approaching the cloudpoint. This is in conformity with the experience for classical Ziegler-Natta catalysed high pressure polymerisation. Below the cloudpoint, going from 500 bar down to 360 bar the productivity increases extremely rapidly. Catalyst consumption was reduced by 20% from that at 1600 bar; (See ΔF in FIG. 2); at the same time the mass flow rate in the recycle increases with increased compressor efficiency at lower pressures going up by 10%. A total catalyst productivity increase can hence be obtained at 360 bar in this case at pressures which are less than a quarter of usual high pressure polymerisation conditions.

The polymerisation process of the invention is based on a finding of increased catalyst system productivity at conditions where neither close prior art or experience with other catalytic systems suggest that an improvement is obtainable. The process is believed to be beneficial in a wide range of conditions. Of course the polymer must remain molten and in this case conversion remains constrained by thermal factors. The two-phase condition coincides with the pressure zone of improving productivity with reducing pressure. High pressure separator equilibrium conditions for given polymer/monomer blends and compression suction intake pressures are constrained by the need to obtain good separation and avoid entrainment of low molecular weight fractions in the recycle.

Examples 2–30

Monomers were supplied in the proportion indicated in Tables 1 and 2 over molecular sieves, where appropriate with oxygen removal by nitrogen sparging. The monomer feed was compressed in two stages and supplied at 60° C. to a 1.5 liter autoclave stirred reactor together with the catalyst system. Table 1 used dimethylsilyltetrahydroindenyl zirconium dichloride together with MAO supplied by Schering AG. The catalyst system is deactivated after the mixture has passed through the reactor and residual monomer is flashed off, not recycled.

Table 2 is similar except a monocyclopentadiene metallocene is used of the formula:

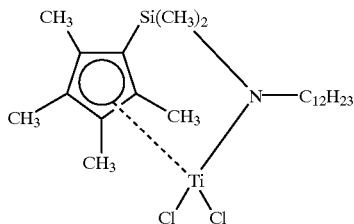

Where $C_{12}H_{23}$ is an aliphatic alkyl substituted cyclo-alkyl group;

TABLE 1

| EX. NO | POLYMERISATION CONDITIONS | | | | | | | CATALYST ACTIVITY (kg.PE/g. metallocen) |
|---|---|---|---|---|---|---|---|---|
| | PRESS. (kg/cm2) | TEMP. (deg C) | COMONOMER TYPE* | COM/C2** (mol/mol) | MI (g/10 min) | DENSITY (g/cm3) | COMONOMER (wt %) | |
| 2 | 1300 | 175 | C4 | 1.2 | 1.6 | 0.9045 | 11.6 | 256.0 |
| 3 | 600 | 170 | C4 | 1.2 | 4.3 | 0.9135 | 10.6 | 194.9 |
| 4 | 600 | 170 | C4 | 1.2 | 3.3 | 0.9126 | 11.6 | 172.3 |
| 5 | 500 | 180 | C4 | 1.2 | 9.4 | 0.9149 | 9.2 | 89.6 |
| 6 | 300 | 180 | C4 | 1.2 | 15.4 | 0.9125 | 11.3 | 277.0 |
| 7 | 200 | 162 | C4 | 1.2 | 5.1 | 0.9079 | 11.6 | 273.8 |
| 8 | 180 | 180 | C4 | 1.2 | 34.0 | 0.9072 | 14.6 | 208.6 |
| 9 | 2200 | 152 | C4 | 2.3 | 19.5 | 0.8720 | 30.9 | 91.3 |
| 10 | 180 | 150 | C4 | 2.4 | 7.1 | 0.8897 | 21.4 | 184.6 |
| 11 | 1600 | 200 | C6 | 0.8 | 15.5 | 0.9153 | 13.2 | 156.0 |
| 12 | 180 | 180 | C6 | 0.8 | 15.7 | 0.9187 | 11.6 | 202.3 |

*C4 = butene-1
C1 = hexene-1
**COM/C2 = ethylene/comonomer molar ratio

TABLE 2

| EX. NO. | COMONOMER IN FEED COMPOSITION WT % | | | | | H2 L/h | PRESS Bar | TEMP °C. | REACTOR RESIDENCE Time Seconds | AL/TM mol/ratio | ACT.[1] | MI G/10 min | TOTAL COMONO Wt % in pol ymer |
|---|---|---|---|---|---|---|---|---|---|---|---|---|---|
| | Ethylene | Propy-lene | 1-butene | 1-hexene | Hexa-diene | | | | | | | | |
| 14 | 40 | 60 | | | | 4.0 | 1000 | 171 | 65 | 1400 | 64.1 | 0.72 | 37.5 |
| 15 | 40 | 60 | | | | 20.0 | 400 | 172 | 51 | 1400 | 166.6 | 1.28 | 46.3 |
| 16 | 40 | 60 | | | | 30.0 | 200 | 169 | 35 | 1400 | 111.2 | 2.8 | 38.0 |
| 17 | 34 | 51 | | | 15 | 5.0 | 1000 | 170 | 68 | 1400 | 51.0 | 5.5 | 36.2 |
| 18 | 34 | 51 | | | 15 | 30.0 | 300 | 172 | 50 | 1400 | 67.8 | 9.2 | 31.3 |
| 19 | 35 | | | 65 | | 3.0 | 1000 | 169 | 76 | 1400 | 73.9 | 3.0 | 31.1 |
| 20 | 35 | | | 65 | | 7.0 | 200 | 170 | 55 | 1400 | 117.5 | 3.5 | 33.9 |
| 21 | 35 | | | 65 | | 9.0 | 100 | 170 | 38 | 1400 | 123.1 | 4.6 | 41.3 |
| 22 | 23.5 | | 76.5 | | | 0.0 | 1000 | 168 | 73 | 1400 | 57.9 | 1.3 | 49.4 |
| 23 | 23.5 | | 76.5 | | | 2.0 | 300 | 168 | 58 | 1400 | 45.8 | 1.9 | 50.8 |
| 24 | 23.5 | | 76.5 | | | 0.0 | 1000 | 170 | 73 | 470 | 31.6 | 1.4 | 53.6 |
| 25 | 23.5 | | 76.5 | | | 2.0 | 300 | 170 | 58 | 470 | 27.1 | 1.8 | 51.7 |
| 26 | 23.5 | | 76.5 | | | 0.0 | 1000 | 170 | 73 | 4200 | 113 | 1.6 | 50.8 |
| 27 | 23.5 | | 76.5 | | | 2.0 | 300 | 170 | 58 | 4200 | 67.0 | 5 | 47.6 |
| 28 | 23.5 | | 76.5 | | | 1.0 | 600 | 170 | 67 | 1400 | 46.3 | 1.3 | 50.6 |
| 29 | 23.5 | | 76.5 | | | 1.5 | 200 | 170 | 51 | 1400 | 72.9 | 1.2 | 55.4 |
| 30 | 23.5 | | 76.5 | | | 2.5 | 120 | 171 | 37 | 1400 | 75.7 | 4.8 | 60.5 |

[1]ACT = activity in kg polymer per gram of metallocene

The catalyst activity in the two phase conditions below the cloudpoint pressure is better than that at usual high pressure conditions involving pressures which are 5 to 10 time higher. The molecular weight is only slightly lower in two phase conditions.

What is claimed is:

1. Process for continuously producing polyolefin comprising:
    (a) continuously feeding olefinic monomer and catalyst system of metallocene and cocatalyst;
    (b) continuously polymerising monomer feed to provide a monomer-polymer mixture, the mixture being at a pressure below the cloudpoint pressure to provide a polymer-rich phase and a monomer-rich phase at a temperature above the melting point of the polymer wherein said polymerisation takes place at a temperature and a pressure where the catalyst system productivity exceeds that which is obtained at twice said pressure above the cloudpoint at that temperature; and
    (c) continuously settling a two phase mixture into a continuous molten polymer phase and a continuous monomer vapour, the latter of which may, optionally, be at least partly recycled to (a).

2. Process according to claim 1 in which:
    a) the polyolefin contains less than 25 weight % of comonomer; and/or
    b) the metallocene is a dicyclopentadienyl transition metal compound.

3. Process according to claim 2 in which the mixture is settled in a separator after the catalyst system has been killed by addition of a killer at a pressure of from 1.2 to 300 bar and the continuous monomer phase is recycled for polymerisation.

4. Process according to claim 3 in which reactor is a continuous reactor and the residence time is from 20 seconds to 10 minutes.

5. Process according claim 4 in which the polymer has a density of from 0.82 to 0.93 g/cm$^3$.

6. Process according to claim 5 in which the polymer has a density of less than 0.90.

7. Process according to claim 1 in which the mixture is settled in a separator after the catalyst system has been killed by addition of a killer at a pressure of from 1.2 to 300 bar and the continuous monomer phase is recycled for polymerisation.

8. Process according to claim 1 in which reactor is a continuous reactor and the residence time is from 20 seconds to 10 minutes.

9. Process according claim 8 in which the polymer has a density of from 0.82 to 0.93 g/cm$^3$.

10. Process according to claim 9 in which the polymer has a density of less than 0.90.

11. Process according to claim 8 in which the catalyst system contains alumoxone cocatalyst, is in the form of a soluble system, an unsupported slurry system or a supported system and/or the mol ratio of alumoxane aluminum to metallocene transition metal is from 10:1 to 10000:1.

12. Process according to claim 1 in which the catalyst system contains alumoxone cocatalyst, is in the form of a soluble system, an unsupported slurry system or a supported system and/or the mol ratio of alumoxane aluminum to metallocene transition metal is from 10:1 to 10000:1.

13. Process according to claim 1 in which the pressure is at least 50 bar, the temperature is at least 10° C. above the polymer melting point, and/or the density of the gaseous phase of reactor contents is at least 200 kg/m$^3$.

14. Process according to claim 13 in which the polymer rich phase contains from 50 to 80 wt % of polymer.

15. Process according to claim 13 in which the gaseous phase of the reactor contents is at least 350 kg/m$^3$.

16. Process for producing a polyolefin comprising:
  (a) feeding ethylene, at least 5 wt % of at least one comonomer, and a catalyst system of a metallocene and a cocatalyst;
  (b) polymerising the monomer and comonomer under agitation to provide a monomer-polymer mixture, the mixture being at a pressure below the cloudpoint pressure at a temperature above the melting point of the polymer and at a pressure of less than 500 bar to provide a polymer-rich phase and a continuous monomer rich phase wherein said polymerisation takes place at a temperature and a pressure where the catalyst system productivity exceeds that which is obtained at twice said pressure above the cloudpoint at that temperature; and
  (c) separating the polymer.

17. Process according to claim 16 in which:
  c) the polyolefin contains less than 10 weight % of comonomer; and/or
  d) the metallocene is a monocyclopentadienyl transition metal compound.

18. Process according to claim 17 in which the reactor is a batch reactor.

19. Process according to claim 16 in which the reactor is a batch reactor.

20. Process according to claim 16 in which reactor is a continuous reactor and the residence time is from 20 seconds to 10 minutes.

21. Process according claim 20 in which the polymer has a density of from 0.82 to 0.93 g/cm$^3$.

22. Process according to claim 21 in which the polymer has a density of less than 0.90.

23. Process according to claim 20 in which the catalyst system contains alumoxone cocatalyst, is in the form of a soluble system, an unsupported slurry system or a supported system and/or the mol ratio of alumoxane aluminum to metallocene transition metal is from 10:1 to 10000:1.

24. Process according to claim 16 in which the catalyst system contains alumoxone cocatalyst, is in the form of a soluble system, an unsupported slurry system or a supported system and/or the mol ratio of alumoxane aluminum to metallocene transition metal is from 10:1 to 10000:1.

25. Process according to claim 16 in which the pressure is at least 50 bar, the temperature is at least 10° C. above the polymer melting point, and/or the density of the gaseous phase of reactor contents is at least 200 kg/m$^3$.

26. Process according to claim 25 in which the polymer rich phase contains from 50 to 80 wt % of polymer.

27. Process according to claim 25 in which the gaseous phase of the reactor contents is at least 350 kg/m$^3$.

\* \* \* \* \*